United States Patent [19]

Hencey, Jr. et al.

[11] 4,311,917

[45] Jan. 19, 1982

[54] NON-POLLUTION MOTOR

[75] Inventors: Thomas R. Hencey, Jr., 1601 Water St., Galveston, Tex. 77550; William J. Murphy, Galveston, Tex.

[73] Assignee: Thomas R. Hencey, Jr., Galveston, Tex.

[21] Appl. No.: 135,233

[22] Filed: Mar. 31, 1980

[51] Int. Cl.³ .................... F25B 11/00; F25B 19/00
[52] U.S. Cl. .................................. 290/1 A; 62/505; 180/302
[58] Field of Search ............... 60/671; 290/1 A, 1 R, 290/52, 2; 62/505; 180/302

[56] References Cited

U.S. PATENT DOCUMENTS

| | | | |
|---|---|---|---|
| 1,926,654 | 9/1933 | Scholl | 62/505 |
| 3,379,008 | 4/1968 | Manganaro | 180/302 |
| 3,681,608 | 8/1972 | Boese et al. | 290/50 |
| 3,792,327 | 2/1974 | Waldorf | 290/50 |
| 3,842,333 | 10/1974 | Boese et al. | 320/2 |
| 3,870,942 | 3/1975 | Boese et al. | 320/2 |
| 3,936,651 | 2/1976 | Abolins et al. | 60/671 |

*Primary Examiner*—J. V. Truhe
*Assistant Examiner*—Shelley Wade
*Attorney, Agent, or Firm*—Arnold, White & Durkee

[57] ABSTRACT

A non-pollution motor powered from a source of a low pressure liquified cryogenic is disclosed. A means for converting, upon demand, a quantity of the cryogenic into a high pressure gas is connected between a gas expander and a storage volume tank. The high pressure gas stored in the volume tank is used to power a gas turbine motor. The gas turbine in turn drives a DC-generator to produce a voltage that both charges a battery pack and drives an output DC-drive motor. When the battery pack is fully charged, the gas turbine is turned off, and the DC-drive motor is powered solely from the battery pack. When the batteries have discharged, the turbine is turned on to drive the DC-generator once again. Both the DC-generator and the DC-drive motor are contained in the cryogenic in heat exchange relationship to cool the units to essentially the temperature of the cryogenic.

26 Claims, 4 Drawing Figures

NON-POLLUTION MOTOR

BACKGROUND OF THE INVENTION

This invention relates to motors. In particular, this invention relates to a non-pollution motor powered from a supply of a liquified cryogenic, such as liquid nitrogen, which is maintained at its cryogenic temperature. The liquified cryogenic is expanded to obtain a high pressure gas that provides the energy needed to power the motor. The high pressure gas is vented to atmosphere without adding any pollutants to the air.

Non-pullution motors powered from a supply of a liquified cryogenic are known in the art. U.S. Pat. Nos. 3,681,609, 3,842,333, and 3,870,942, each issued to the applicant of the present application as a joint patentee, disclose the use of a liquidfied cryogenic as the power source for a non-pullution motor. The liquified cryogenic is maintained at a high pressure due to the expansion of some of the cryogenic from its liquid to its gaseous state. This high pressure gas is used to power a gas turbine motor which, in turn, powers a DC-generator. The power from the generator is stored in batteries. The batteries are used to power a DC-motor which provides the output drive for the non-pullution motor.

To achieve performance characteristics from both the DC-generator and DC-drive motor that exceed their normal ratings, it is important to cool both units to as low a temperature as possible. U.S. Pat. Nos. 3,842,333 and 3,870,942 disclose two different approaches to this requirement. First, U.S. Pat. No. 3,842,333 shows passing the liquified gas through tubes that pass around the drive motor housing in heat exchange relationship to achieve cooling of the motor. Second, U.S. No. 3,870,942 discloses that the liquified cryogenic can be passed through both the DC-generator and the DC-drive motor. In the cooling system of U.S. Pat. No. 3,842,333, only a minimum efficiency in cooling is achieved. In the cooling system of U.S. Pat. No. 3,870,942, a greater efficiency is achieved, but at a loss in performance due to the presence of the fluid in the moving parts of the units.

Another problem present in these prior-art motors is the excessive loss of high pressure gas through evaporation of the liquified cryogenic in the cryogenic tank. The rate of evaporation of the pressurized liquid cryogenic is directly related to the pressure. The higher the pressure, the greater the rate of evaporation. For the non-pollution motor disclosed in the above references, the pressure, beginning at the source of liquified cryogenic up thru the gas motor, is maintained at the same high pressure level. Since the liquified cryogenic is at a high pressure, excessive evaporation of the cryogenic in the cryogenic tank results.

Accordingly, it would be advantageous to provide a non-pollution motor that minimizes the rate of evaporation of a liquified cryogenic by substantially reducing its operating pressure while maintaining a high pressure gas supply for use in the gas motor. It would also be advantageous to achieve a significant improvement in the performance characteristics from both the generator and the drive motor by cooling them to essentially the same cryogenic temperature as the temperaure of the liquified cryogenic without direct contact between the cryogenic and the units.

SUMMARY OF THE INVENTION

In accordance with the present invention, a non-pollution motor powered from a source of a liquified cryogenic maintained at a cryogenic temperature is disclosed. A cryogenic tank is provided for storing the supply of the liquified cryogenic, such as liquid nitrogen, at its super cool temperature. Provided in the cryogenic tank is a receiving means consisting of a stainless steel tube passing through the cryogenic tank for receiving a DC-generator and a DC-drive motor. The stainless steel tube isolates the liquified cryogenic from direct contact with the DC-motor and the generator while maintaining the temperature within the receiving means at approximately the cryogenic temperature. The drive shafts of both the generator and the drive motor protrude from opposite ends of the cryogenic tank. Insulating cover plates provided at each of the stainless steel tube insulates the cryogenic temperatures inside the receiving means from escaping. A vent is also provided to maintain atmospheric pressure inside the steel tube.

An accumulator or volume tank is provided for maintaining high pressure gas that is obtained by expanding a quantity of the liquified cryogenic into its gaseous state. The pressure within the accumulator is regulated to within a predetermined range. The accumulator includes a run valve that is selectively actuated to provide high pressure gas from within the accumulator for an air turbine motor. The accumulator further includes a pressure sensor for sensing the pressure within the accumulator tank.

Connected to the cryogenic tank is a metering means for metering out the quantity of liquified cryogenic to be expanded. The metering means responds to the pressure signal from the accumulator when the pressure within the accumulator decreases to a predetermined level to meter an amount of cryogenic into a metering tank. The amount of cryogenic transferred depends upon the current pressure in the tank. A fixed interval of time is allowed for cryogenic to flow from the cryogenic tank to the metering tank. This volume of cryogenic is then expanded. If the pressure in the volume tank reaches an upper predetermined level, no more cryogenic is transferred from the cryogenic tank. If the volume tank pressure is below the upper level, the metering means cycles to expand another volume of cryogenic. This cycling is continued until the desired pressure is reached.

Located on the cryogenic tank or low side of the metering tank are two valves that respectively allow the cryogenic to enter the metering tank and to vent expanded gas within the metering tank as it fills. Also provided on the low pressure side of the metering tank is a check valve that prohibits the high pressure gas from reaching the low pressure cryogenic tank. Connected to the high pressure side of the metering tanks is a valve that selectively applies the cryogenic to the expansion system to be expanded into the high pressure gas. Controlling both the high and the low side valves is a valve controller that responds to the pressure signal from the accumulator to fill and empty the metering tank. A turbo-expander is provided to expand the liquified gas from the metering tank into the high pressure gas.

An air turbine motor is connected to the DC-generator and responds to the passage therethrough of the pressurized gas to provide the drive force to the generator. The DC-generator in turn powers both the DC-motor and a battery pack to both power the non-pollution motor and to charge the batteries. When the charge level of the battery pack reaches a predetermined level, the gas turbine is turned off. The DC-drive motor is then powered directly from the battery pack. Both the drive motor and the DC-generator are contained to the cryogenic tank and maintained at essentially the cryogenic temperature of the liquified cryogenic.

BRIEF DESCRIPTION OF THE DRAWINGS

A non-pollution motor powered from a source of a liquified cryogenic constructed in accordance with the preferred embodiment of the invention is illustrated in the accompanying drawings in which.

Similar reference numerals refer to similar parts throughout the several views of the drawings.

DETAILED DESCRIPTION OF THE PREFERRED EMBODIMENT

Figure 1:
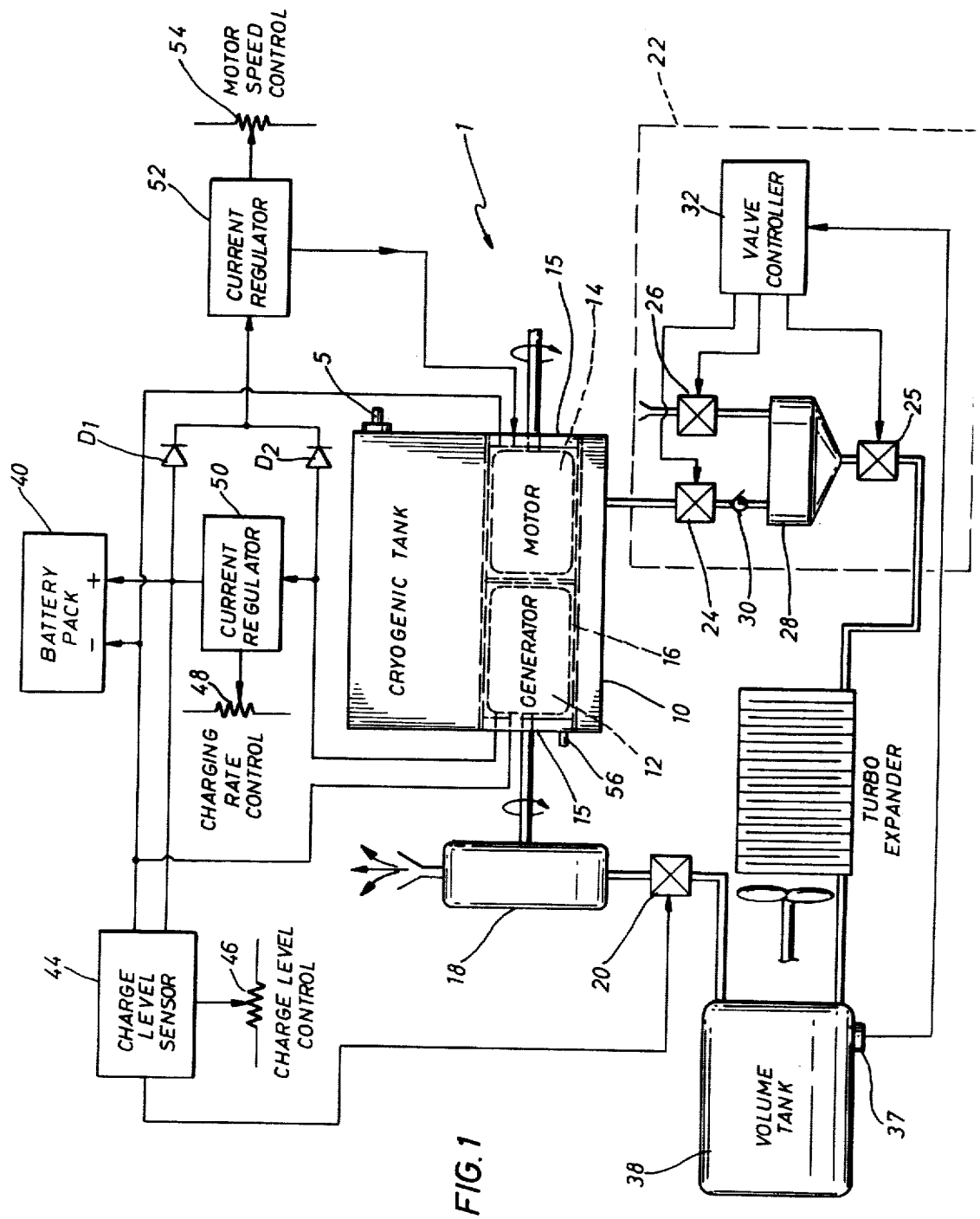
FIG. 1 is a block diagram of the present invention.

Referring to the Figures and first to FIG. 1, a block diagram of the non-pollution motor 1 of the present invention is shown. The source of a liquified cryogenic, such as liquid nitrogen, that provides the energy to power the non-pollution motor 1 is contained in a cryogenic tank 10. Passing through the cryogenic tank 10 is a receiving means consisting of a stainless steel tube 16 and insulating end plates 15 that receives therein a DC-generator 12 and a DC-drive motor 14. For the presently preferred embodiment of the invention, both the DC-generator and the DC-drive motor are General Electric motors Model 3487R which have been modified for operation at cryogenic temperatures. The motor bearings have been replaced by Garlock Industries cryogenic bearings No. 248020 and cryogenic seals No. 24110-0203. Further, the DC-generator has been modified to permit rotation at 8000 RPM by wrapping the rotor with fiberglass. At 8000 RPM the DC-generator outputs 36 VDC @ 400 amps.

The drive shafts of the generator 12 and the motor 14 protrude through plates 15 at opposite ends of the cryogenic tank 10. The stainless steel tube 16 isolates the liquified nitrogen within the tank 10 from direct contact with the generator 12 and the motor 14. Included in the cryogenic tank 10 is a pressure relief valve 5 that vents to atmosphere the pressurized gas generator by evaporation of the cryogenic within the tank 10. Also, a vent 56 is included with the insulating end plates 15 to maintain atmospheric pressure within the stainless steel tube while maintaining the super cool temperatures within.

The cryogenic is outputted from tank 10 to a metering means 22 so that the liquid gas can be eventually converted into its gaseous state at a higher pressure level. The pressure of the liqufed cryogenic within the cryogenic tank is maintained approximately within the range of 15 to 25 psi. The operating pressure of the cryogenic after conversion into its gaseous state will be within the range of 125 to 300 psi. When a liquified cryogenic goes through an expansion, a substantial increase in pressure results because of the increase in volume. For liquified nitrogen, a 720 to 1 volume increase occurs.

The metering means 22 shown in FIG. 1 consists of metering tank 28 which will contain a quantity of the cryogenic metered from the cryogenic tank 10 through a low pressure side valve 24 and check valve 30. Check valve 30 operates to prevent any high pressure gas of the volume tank 38 from reaching the cryogenic tank should the metering means fail to function properly. Connected to the metering tank 28 are two additional gas solenoid valves, vent valve 26 and high pressure side valve 25. Vent valve 26 operates to vent or decompress the metering tank 28 when it is being filled from the cryogenic tank 10. High pressure side valve 25 operates to apply the cryogenic in metering tank 28 into the turbo-expander 36 for expansion into the high pressure gas. Connected to each of the valves and responsive to the output signal from a pressure sensor 37 located on the volume tank 38 is valve controller 32 which selectively actuates the valves to transfer enough cryogenic into the expansion system to achieve the desired pressure level in the volume tank 38.

Figure 2:
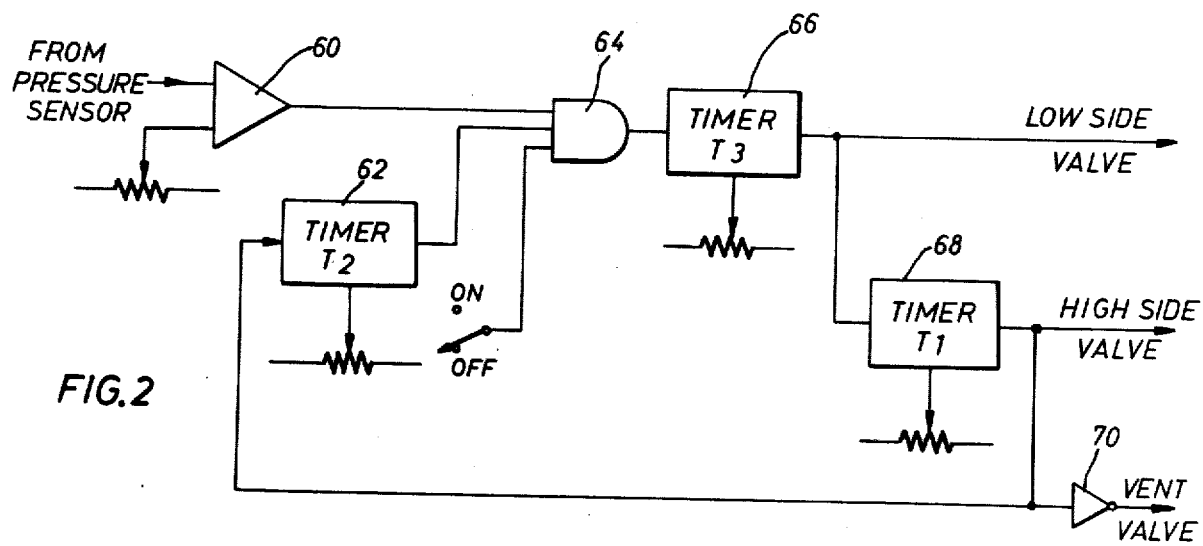
FIG. 2 is a block diagram of the valve controller shown in FIG. 1.

Referring now to the circuit diagram of the valve controller 32 shown in FIG. 2, the signal from the pressure transducer 37 is converted into a digital signal by comparator amplifier 60. When the pressure in volume tank 38 drops to a predetermined lower level, comparator 60 switcher states. The output of amplifier 60 is applied as one input to AND gate 64. The output from AND gate 64 is used to trip timer 66 to produce a fill time interval during which liquified gas is transferred into metering tank 28. The output from timer 66 is applied to low side valve 24. The output from timer 66 trips timer 68 when the fill time interval is completed. Timer 68 controls high side valve 25 to apply the metered cryogenic to the gas expansion system. The output from timer 68 is inverted to control vent valve 26. At the completion of the time interval of timer 68, timer 62 is started. Timer 62 provides a variable delay between the closing of the high side valve 25 and opening of the vent valve 26, and the opening of the low side valve 24 to permit decompression of the metering tank 28 before refilling starts. When high side valve 25 is closed, the pressure in metering tank 28 is the same high pressure as the expanded gas in volume tank 38. Decompression of metering tank 28 is required before the lower pressure cryogenic can be turned on.

Figure 3:
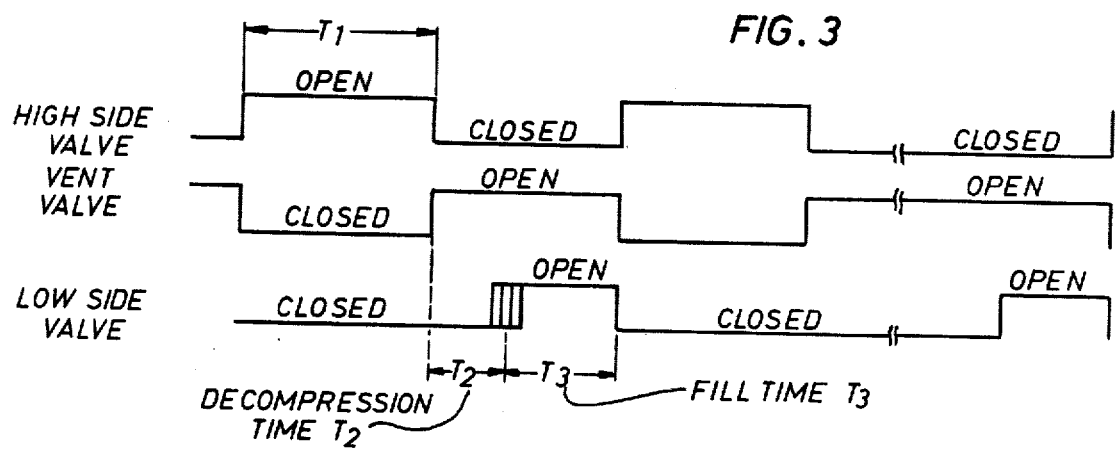
FIG. 3 is a timing diagram of the valve controller of FIG. 2.

When the pressure in volume tank 38 reaches the lower pressure level, the operation of the metering means 22 is started by triggering timer 66 to open low side valve 24. Vent valve 26 was already open and high side valve 25 was closed. At the completion of the full time, a quantity of cryogenic has been transferred into metering tank 28. The pressure in the cryogenic tank 10 determines the precise amount of cryogenic transferred during the fill time interval $T_3$. At the completion of the fill interval, high side valve 25 is opened and vent valve 26 is closed. The liquified cryogenic in metering tank 28 is expanded into its high pressure gas. This gas causes the pressure in volume tank 38 to increase. If the pressure in volume tank 38 is equal to or greater than a predetermined upper level, the cycling of metering means 22 is haulted with the vent valve open and both the high and low side valves 25, 24 closed. If the pressure is less than the upper level, the cycling of the metering means 22 is permitted to continue. In this manner, the pressure in volume tank 38 will be increased in small increments until the desired level is reached. FIG. 3 illustrates the timing relationship between the timers 62, 66 and 68 which generate the control signals to the valves.

Connected to the output side of the volume tank 38 is a run valve 20 connected in series with a gas turbine motor 18. The output of the gas turbine motor 18 is connected to the input of the DC-generator and provides the drive to rotate the shaft to the generator. When run vlave 20 is open, the high presure gas within volume tank 38 is passed through the gas turbine 18 and vented to atmosphere. For the preferred embodiment, the gas motor is manufactured and sold by Air Turbine Technology Corporation of Boca Raton, Florida as their Model 705 prototype expansion motor. This motor develops 5 horsepower at 50 CFM and rotates at 30,000 RPM. The run valve 20 is controlled by a charge level sensor circuit that is monitoring the charge level on the battery pack 40.

The output voltage from the DC-generator is applied to a current regulator 50 which, in turn, provides a regulated charging current to the battery pack 40. When the charge level on the battery pack 40 has reached a predetermined upper level, the run valve 20 will be shut off. While the DC-generator 12 is being driven by the gas motor 18, the voltage produced by the generator is used to both charge the battery pack 40 and to drive the DC-drive motor 14. When the charge level on the battery pack 40 reaches the predetermined upper level, the charge level sensor 44 operates to shut off run valve 20 to cause the voltage produced by the generator 12 to reduce to zero. When this happens, the energy stored in battery pack 40 becomes the primary power source for driving the DC-motor 14. Motor 14 does not care from which source of power its drive current is originating.

A pair of steering diodes D1 and D2 are respectively connected to the output of the battery pack 40 and the output of the generator 12. Both diodes are also connected to current reguator 52 which responds to a motor speed control signal to provide a regulated drive current to the drive motor 14. When generator 12 is running, the output voltage produced is applied to current regulator 50 that responds to a charging rate control signal to provide the charging current to the battery pack 40. For the preferred embodiment, the output of current regulator 50 is designed to charge battery pack 40 to a voltage of approximately 36 VDC. Since the voltage generator by the generator 12 is greater than the voltage on the battery pack 40, diode D2 becomes conducting and diode D1 becomes reverse biased. In this way, the DC-generator 12 will simultaneously supply the power to run the DC-motor 14 and to charge battery pack 40.

Figure 4:
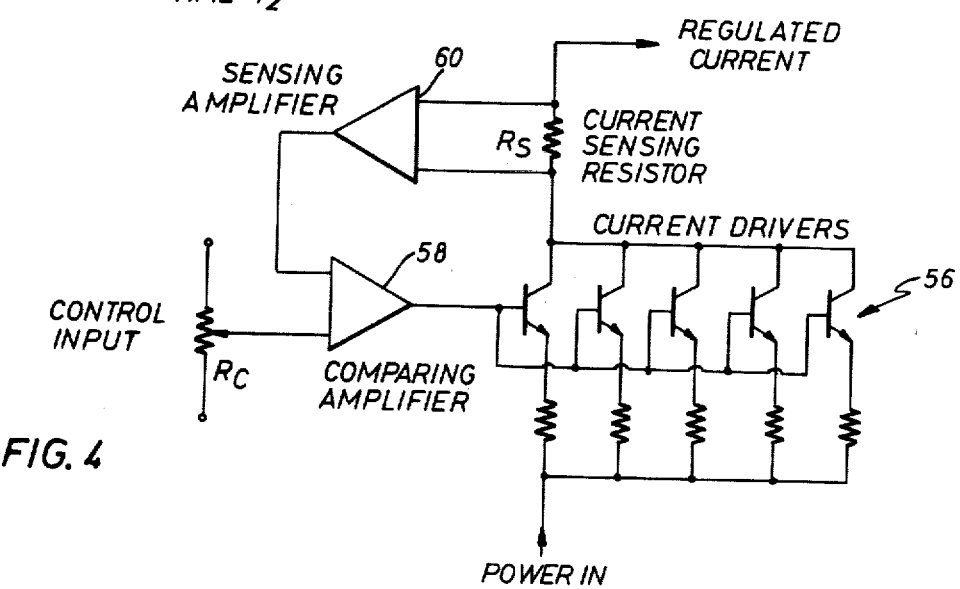
FIG. 4 is a circuit diagram of the current regulators used to regulate the current to both the battery pack and to the DC-drive motor.

Turning now to FIG. 4, a circuit diagram for the current regulators 50 and 52 is shown. Circuits to perform current regulation are well known in the art, and the circuit of FIG. 3 is representative of prior art circuits. Current driver transistors 56 are shown connected to the power voltage side of the regulator. The regulator current supplied on the output of the current regulator 50, 52 passes through the series pass transistors 56 and a current sensing resistor $R_s$. The voltage developed across the $R_s$ is amplified in sensing amplifier 60 and applied as one input to a comparing amplifier 58. The other input of the comparing amplifier 58 is provided by a variable resistor $R_c$ that sets the amount of output current that is to be regulated. The voltage on the output of the comparing amplifier 58 is applied as a control voltage to the bases of the series pass transistors 56 which cause transistors 56 to deliver current into the output circuit.

In operation, the motor 1 will be powered by the passage of high pressure gas through the gas turbine motor 18. Motor 18 drives the DC-generator 12 to produce a voltage that will both charge battery pack 40 and excite DC-motor 14. When the battery pack 40 reaches a sufficient charge level, the gas turbine 18 will be turned off and the battery pack energy used to continue the current to motor 14. When the charge level on battery pack 40 decreases to a predetermined lower level, the air turbine 18 will once again be turned on the drive generator 12 to recharge the battery pack. To provide the high pressure gas required to drive the gas turbine 18, the metering means 22 is operated to provide a quantity of liquified cryogenic for expansion into high pressure gas. The pressure within the volume tank 38 is maintained between the lower and an upper value by sensing the pressure within the volume tank 38 and operating the metering means 22 to provide the cryogenic, as required, at the input of a turbo-expander 36.

In describing the invention, reference has been made to a preferred embodiment. However, those skilled in the art and familiar with the disclosure of the invention may recognize additions, deletions, substitutions or other modifications which would fall within the purview of the invention as defined in the appended claims.

What is claimed is:

1. A motor powered from a source of a low pressure liquified cryogenic comprising:
   (a) a means for converting the low pressure cryogenic into high pressure gas; and
   (b) a power generating means, including a voltage generator and a drive motor, responsive to the high pressure gas, for generating the output drive of said motor, said generator and said drive motor maintained in heat exchange relationship to the cryogenic source thereby to cool said generator and said drive motor to essentially the temperature of the cryogenic, said generator and said motor contained in the source but isolated from direct contact with the liquified cryogenic.

2. The motor of claim 1 wherein said means for converting from low pressure liquified cryogenic into the high pressure gas comprises:
   (a) a volume tank, for storing the high pressure gas, said tank including a pressure sensor for sensing the pressure within said tank;
   (b) a valving means responsive to the pressure in said tank, for providing a quantity of low pressure cryogenic from the source for conversion into the high pressure gas; and
   (c) a turbo-expander for expanding the cryogenic from said valving means.

3. The motor of claims 1 or 2 wherein said power generating means further comprises:
   (a) a gas turbine motor responsive to the passage therethrough of the high pressure gas, for driving said generator, said gas motor having a run valve for periodically applying the high pressure gas to said gas motor; and
   (b) a battery pack having at least one battery for storing a portion of the power generated by said generator.

4. The motor of claim 3 wherein said battery pack further includes:

(a) a charging regulator connected to the output of said generator and responsive to a charging rate control signal, for supplying a regulated charging current to said battery pack; and (b) a charge level sensor connected to said battery and responsive to a charge level control signal, for generating a power level signal indicative of the power stored in said battery pack, the power level signal controlling the run valve of said gas turbine to apply high pressure gas to said motor when the charge level on said battery pack is below a predetermined level.

5. The motor of claim 3 wherein said drive motor further includes:

(a) first and second steering diodes connected respectively to the output from said battery pack and the output from said generator, for respectively applying the output from said generator to said drive motor when said gas turbine is running, and for applying the output of said battery to said drive motor when said gas turbine is not running, said generator charging said battery pack while supplying power to said drive motor; and (b) a current regulator connected to said steering diodes and responsive to a speed control signal, for supplying a drive current to said drive motor to produce the output drive of the motor.

6. The motor of claim 1 wherein the source of liquified cryogenic is stored in a cryogenic tank having means therein for receiving said drive motor and said generator, said receiving means isolating the liquified gas within the tank from direct contact with said drive motor and said generator.

7. The motor of claim 6 wherein said receiving means is a stainless steel tube passing through said cryogenic tank such that the driveshafts of said generator and said drive motor protrude from opposite ends of the tube, and wherein said tube further includes means for maintaining atmospheric pressure in said tube while maintaining the super cool temperature within.

8. The motor of claim 1 wherein said generator and said drive motor are direct current units.

9. The motor of claim 2 wherein said valving means comprises:

(a) a metering tank, for receiving a quantity of the liquified cryogenic from the source;

(b) high and low side valves associated with said metering tank, for respectively allowing the quantity of cryogenic in said metering tank to be expanded and allowing the cryogenic from said source to enter said metering tank;

(c) a check valve connected between said low side valve and said metering tank, for preventing the high pressure gas from reaching the source;

(d) a vent valve connected to said metering tank, for depressurizing said metering tank and releasing to atmosphere the expanded gas in said metering tank during filling from the source; and (e) a valve control means responsive to the pressure in said accumulator for controlling said high and low side valves and said vent valve to provide cryogenic to said turboexpander when the pressure in said volume tank has dropped to a predetermined lower level, said control means disabled when the pressure in said volume tank has reached a predetermined upper level.

10. A non-pollution motor comprising:

(a) a cryogenic tank for containing a supply of a liquified cryogenic at a low pressure;

(b) a means for obtaining a quantity of high pressure gas through expansion of a quantity of the low pressure cryogenic from said tank;

(c) a gas turbine connected to said accumulator and responsive to the passage therethrough of the pressurized gas, for generating an output drive; and (d) an electro-motive means responsive to said gas turbine, for converting the output drive of said gas turbine into the output drive of the non-pollution motor, said motive means including, (i) a generator responsive to the output drive of said gas turbine, for generating electrical power, (ii) a power storage means connected to the output of said generator, for storing electrical power, said power storage means generating a power level signal indicative of the stored power, and (iii) a drive motor responsive to said generator and said storage means, for producing the output drive of the non-pollution motor, said generator and said drive motor contained in said cryogenic tank in heat exchange relationship with the liquified cryogenic thereby cooling said generator and said motor to essentially the cryogenic temperature of the cryogenic, said generator and said motor isolated from direct contact with the liquified cryogenic.

11. The motor of claim 10 wherein the cryogenic tank further includes a means therein for receiving said drive motor and said generator, said receiving means isolating the cryogenic from direct contact with said drive motor and said generator.

12. The motor of claim 11 wherein said receiving means is a stainless steel tube passing through said cryogenic tank such that the driveshafts of said generator and said drive motor protrude from opposite ends of said tube, and wherein said tube further includes means for maintaining atmospheric pressure in said tube while maintaining the super cold temperature within.

13. The motor of claim 10 wherein said generator is a DC-generator.

14. The motor of claim 10 wherein said drive motor is a DC-motor.

15. The motor of claim 10 wherein said means for obtaining a quantity of high pressure gas comprises:

(a) an accumulator, for containing the high pressure gas, the pressure in said accumulator regulated within a predetermined range;

(b) a metering means connected to said cryogenic tank and responsive to the pressure in said accumulator, for metering out a quantity of the low pressure cryogenic from said cryogenic tank; and (c) a gas expansion means connected between said metering means and said accumulator, for expanding the cryogenic in said metering means into the pressurized gas.

16. The motor of claim 15 wherein said accumulator further comprises:

(a) a run valve responsive to the power level signal, for applying the high pressure gas to said gas turbine when the power level in said power storage means drops below a predetermined level; and (b) a pressure sensor, for sensing the pressure in said accumulator.

17. The motor of claim 15 wherein said metering means comprises:

(a) a metering tank, for receiving a quantity of cryogenic from said cryogenic tank;

(b) high and low side valves connected to said metering tank, for respectively allowing the cryogenic contained in the metering tank to enter said gas expansion means and allowing the liquified gas from said cryogenic tank to enter said metering tank;

(c) a check valve connected between said low side valve and said metering tank, for preventing the high pressure gas from reaching said cryogenic tank;

(d) a vent valve connected to said metering tank, for depressurizing said metering tank and releasing to atmosphere the expanded gas in said metering tank during filling from said cryogenic tank; and (e) a valve control means responsive to the pressure in said accumulator, for controlling said high and low side valves and said vent valve to provide the cryogenic to said gas expansion means when the pressure in said accumulator has dropped to a predetermined lower level, said control means disabled when the pressure in said volume tank has reached a predetermined upper level.

18. The motor of claim 10 wherein said power storage means comprises:

(a) at least one electrical storage battery, for storing electrical power generated by said generator;

(b) a charging regulator connected to the output of said generator and responsive to a charging rate control signal, for supplying a regulated charging current to said storage batteries; and (c) a charge level sensor connected to said battery and responsive to a charge level control signal, for generating the power level signal indicative of the power stored in said battery.

19. The motor of claim 14 wherein said drive motor includes:

(a) first and second steering diodes connected respectively to the output from said battery and the output from said generator, for respectively applying the output from said generator to said drive motor when said gas turbine is running, and for applying the output of said battery to said drive motor when said gas turbine is not running; and (b) a current regulator connected to said steering diodes and responsive to a speed control signal, for applying a drive current to said drive motor to produce the output drive of the non-pollution motor.

20. A non-polluting automobile engine powered from a source of a liquified cryogenic existing at cryogenic temperatures comprising:

(a) a cryogenic tank for containing the supply of the liquified cryogenic at a low pressure;

(b) an accumulator, for containing high pressure gas that is obtained by expanding the cryogenic into its gaseous state, and where the pressure in said accumulator is regulated within a predetermined range, said accumulator including, (i) a run valve, for controllably releasing the high pressure gas from within said accumulator, and (ii) a pressure sensor, for sensing the pressure within said accumulator;

(c) a metering means connected to said cryogenic tank and responsive to the pressure in said accumulator, for metering out a quantity of the cryogenic from said cryogenic tank;

(d) a gas expansion means connected between said metering means and said accumulator, for expanding the quantity of the cryogenic in said metering means into the pressurized gas;

(e) a gas turbine connected to said run valve and responsive to the passage therethrough of the pressurized gas, for generating an output drive; and (f) an electro-motive means responsive to said gas turbine, for converting the output drive of said gas turbine into the output drive of the non-polluting engine, said motive means including, (i) a DC-generator responsive to the output drive of said gas turbine, for generating a DC voltage, (ii) a battery pack connected to the output of said generator, for storing electrical power, said battery pack generating a power level signal indicative of the charge level of said battery pack, the power level signal controlling said run valve to operate said gas turbine, and (iii) a DC-drive motor operably connected to said DC-generator and said battery pack and responsive to a speed control signal, for producing the output drive of the automobile engine, said DC-generator and said DC-drive motor contained in said cryogenic tank in heat exchange relationship with the liquified cryogenic to cool said generator and said drive motor to essentially the cryogenic temperature of the cryogenic, said generator and said motor isolated from direct contact with the liquified cryogenic.

21. A non-polluting automobile engine powered from a source of low pressure liquified cryogenic existing in liquified form at cryogenic temperatures comprising:

(a) a converter for converting the low pressure liquified cryogenic into a high pressure gas; and (b) an electro-motive means, including a voltage generator and a drive motor, responsive to the high pressure gas, for generating the output drive of the engine, the cryogenic source containing said generator and said motor, and cooling said generator and said drive motor to essentially the temperature of the cryogenic without direct contact between the liquified cryogenic and either said generator or said motor.

22. The engine of claim 21 wherein said converter comprises:

(a) a volume tank, for storing the high pressure gas, said tank including a pressure sensor for sensing the pressure within said tank;

(b) a valving means responsive to the pressure in said tank, for providing a quantity of low pressure cryogenic from the source for conversion into the high pressure gas; and (c) a turbo-expander for expanding the cryogenic from said valving means.

23. The engine of claims 21 or 22 wherein said electromotive means further comprises:

(a) a gas turbine motor responsive to the passage therethrough of the high pressure gas, for driving said generator, said gas motor having a run valve for periodically applying the high pressure gas to said gas motor; and (b) a battery pack having at least one battery for storing a portion of the power generated by said generator.

24. The engine of claim 23 wherein said battery pack further includes:

(a) a charging regulator connected to the output of said generator and responsive to a charging rate control signal, for supplying a regulated charging current to said battery pack; and
(b) a charge level sensor connected to said battery and responsive to a charge level control signal, for generating a power level signal indicative of the power stored in said battery pack, the power level signal controlling the run valve of said gas turbine to apply high pressure gas to said motor when the charge level on said battery pack is below a predetermined level.

25. The engine of claim 23 wherein said drive motor further includes
means for respectively applying the output from said generator to said drive motor when said gas turbine is running, and for applying the output of said battery to said drive motor when said gas turbine is not running, said generator charging said battery pack while supplying power to said drive motor.

26. The engine of claim 21 wherein the source of liquified cryogenic is stored in a cryogenic tank having means therein for receiving said drive motor and said generator, said receiving means isolating the liquified gas within the tank from direct contact with said drive motor and said generator.

* * * * *